US006253024B1

United States Patent
Shima

(10) Patent No.: US 6,253,024 B1
(45) Date of Patent: *Jun. 26, 2001

(54) APPARATUS FOR RECORDING A DIGITAL VIDEO SIGNAL

(75) Inventor: Hisato Shima, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/047,235

(22) Filed: Mar. 25, 1998

(30) Foreign Application Priority Data

Feb. 15, 1994 (JP) .................................................. 6-040448

(51) Int. Cl.[7] ............................... H04N 5/917; H04N 5/92
(52) U.S. Cl. ............................................. 386/124; 386/109
(58) Field of Search ............................. 386/124, 46, 117, 386/109, 107, 92, 111, 112, 114, 113, 115, 116, 21–22, 52; 348/384; H04N 5/917, 5/92

(56) References Cited

U.S. PATENT DOCUMENTS 5,404,248 * 4/1995 Shimoda et al. ...................... 360/48
5,864,649 * 1/1999 Shima ................................. 386/124

FOREIGN PATENT DOCUMENTS 62-269579    11/1987   (JP) .

OTHER PUBLICATIONS

Patent Abstracts of Japan vol. 12, No. 158 (E–608), May 13, 1988 of JP 62–269579, Nov. 24, 1987.

* cited by examiner

Primary Examiner—Robert Chevalier
(74) Attorney, Agent, or Firm—Frommer Lawrence & Haug, LLP.; William S. Frommer; Dennis M. Smid

(57) ABSTRACT

Digital video tape recorder which provides for the simultaneous recording of digital video signals and transmitting of those digital video signals either as analog or digital output signals, for example, for monitoring. In one mode, a recordable digital video signal is produced from a received digital video signal and recorded simultaneously with the conversion of the received digital video signal to an analog video signal which is supplied as an output. In another mode, an analog video signal is received, converted to a digital video signal for recording, and the converted digital video signal is simultaneously transmitted as an output video signal.

24 Claims, 7 Drawing Sheets

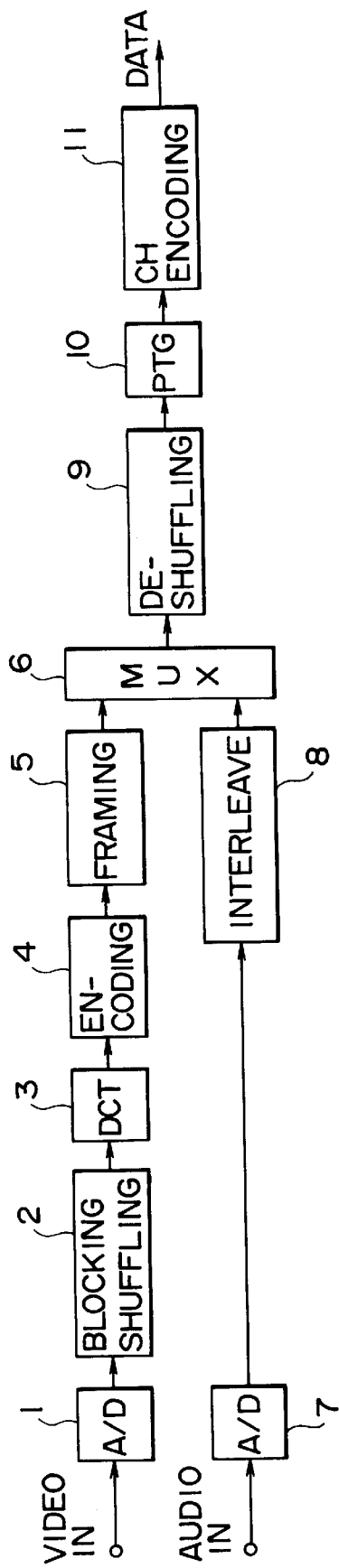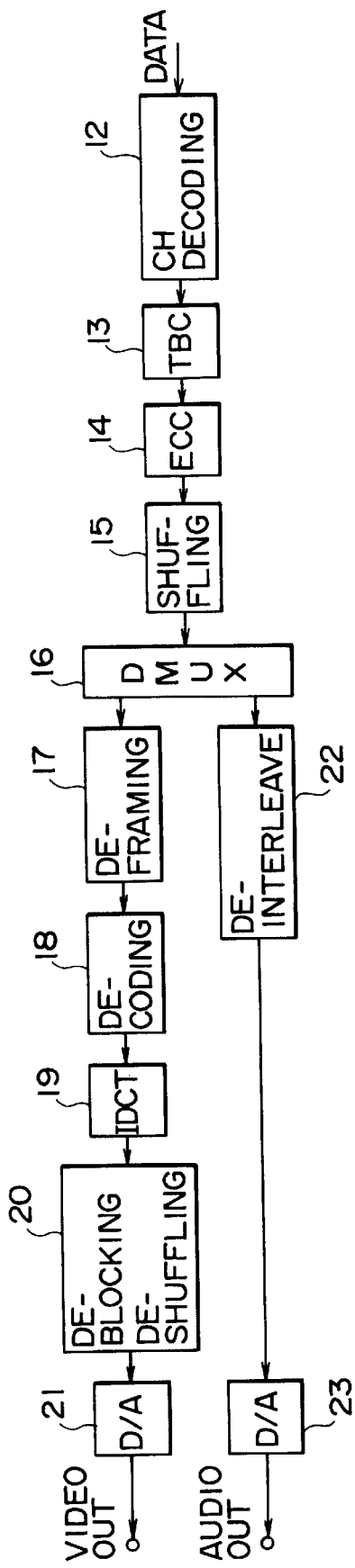

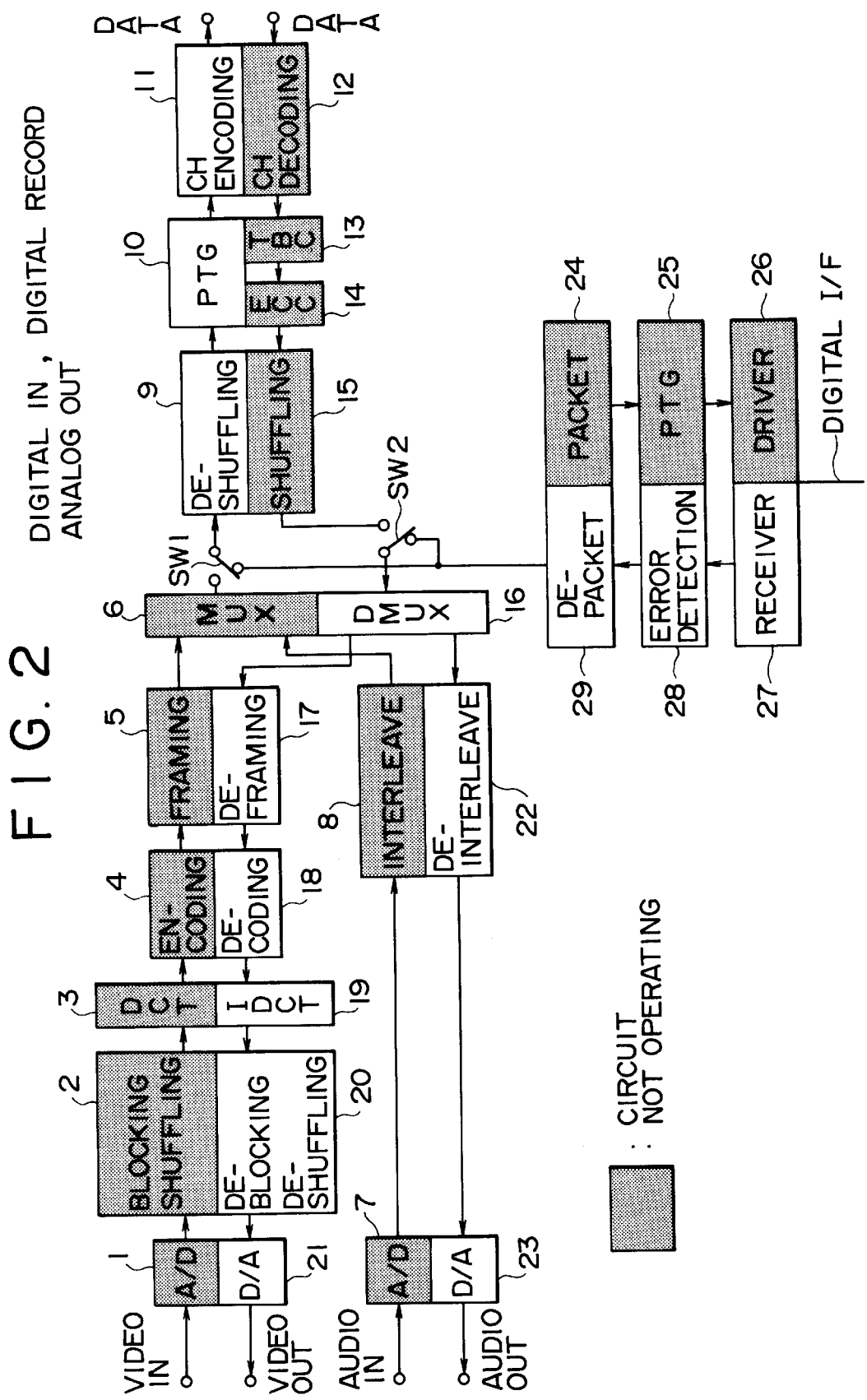

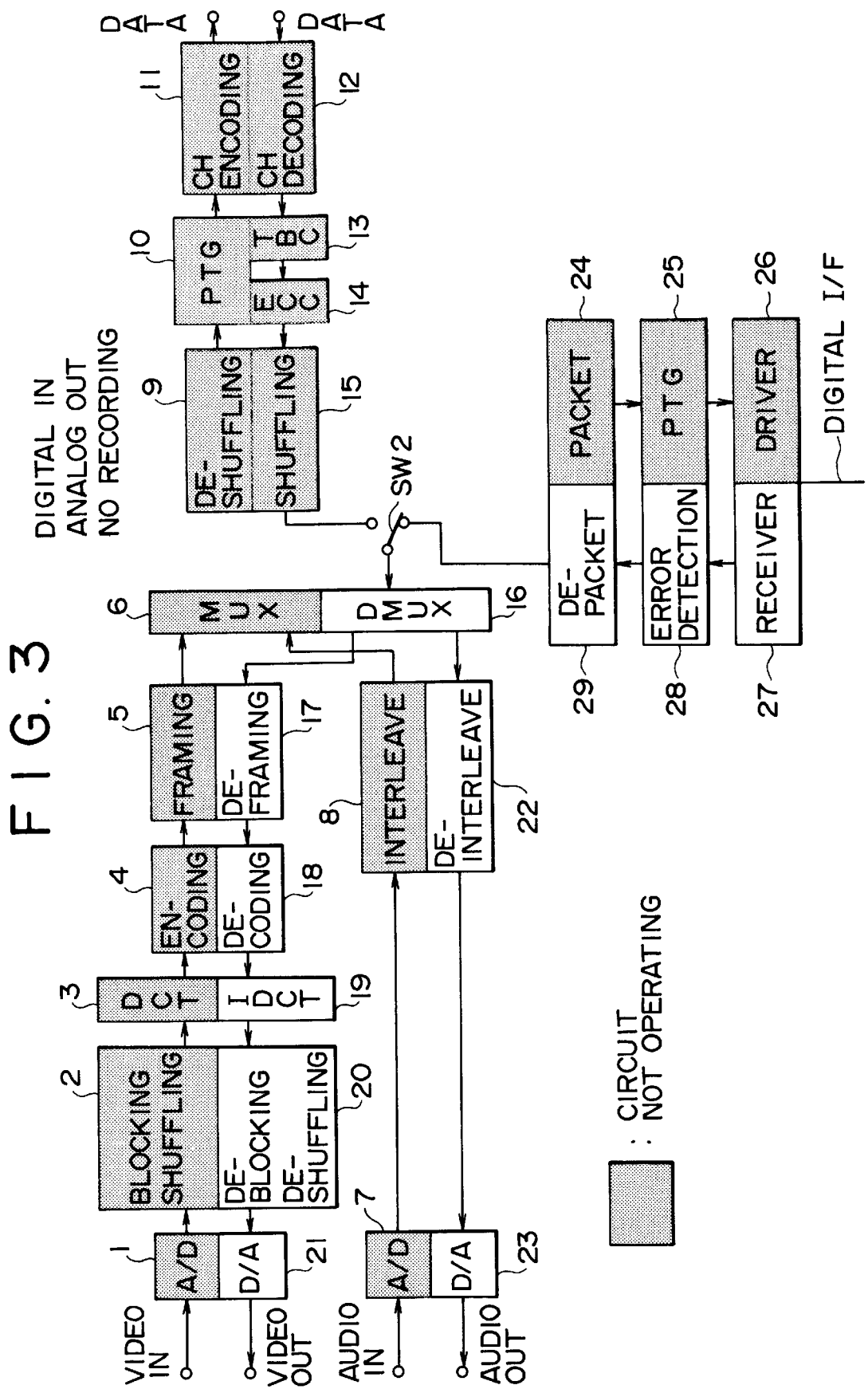

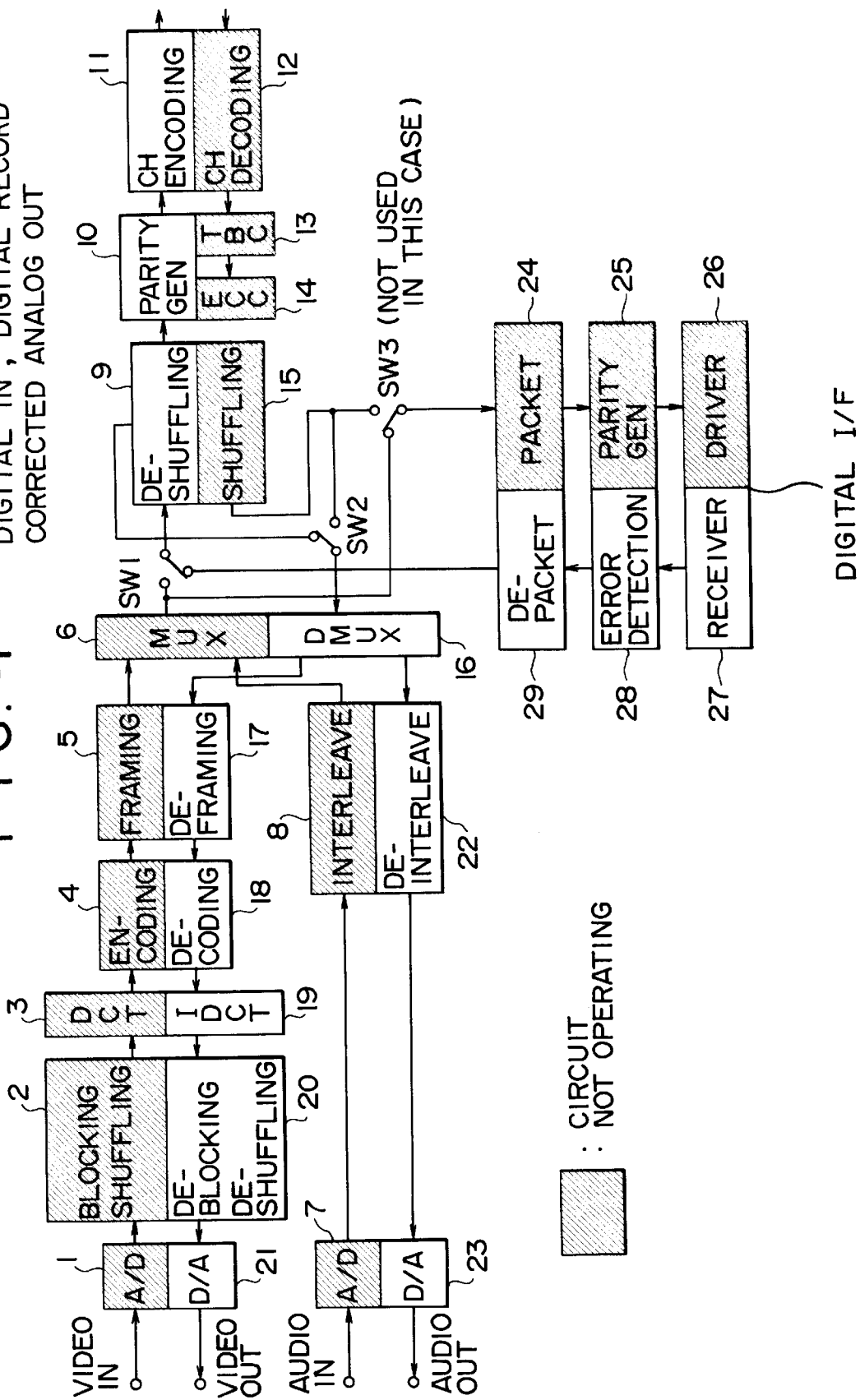

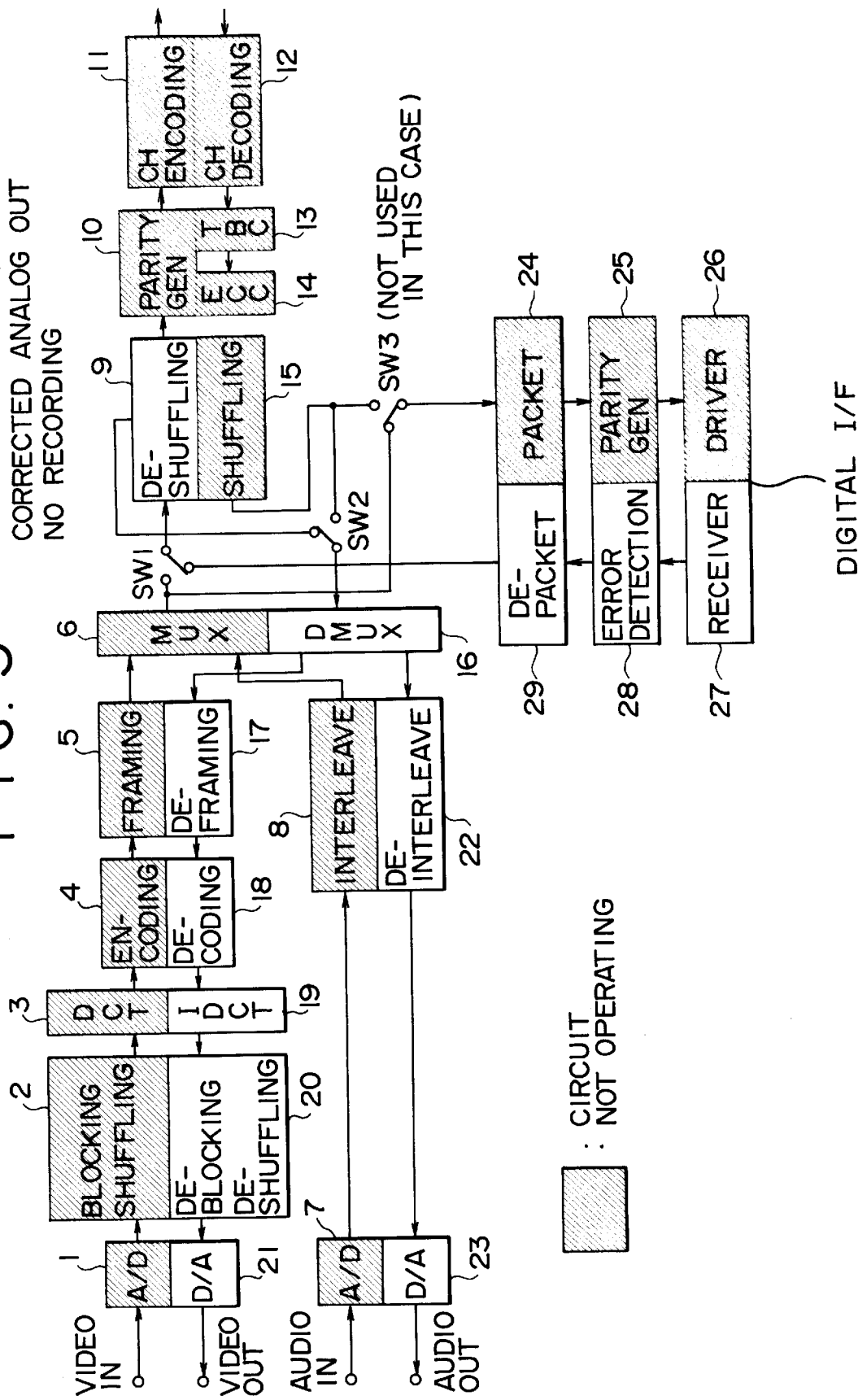

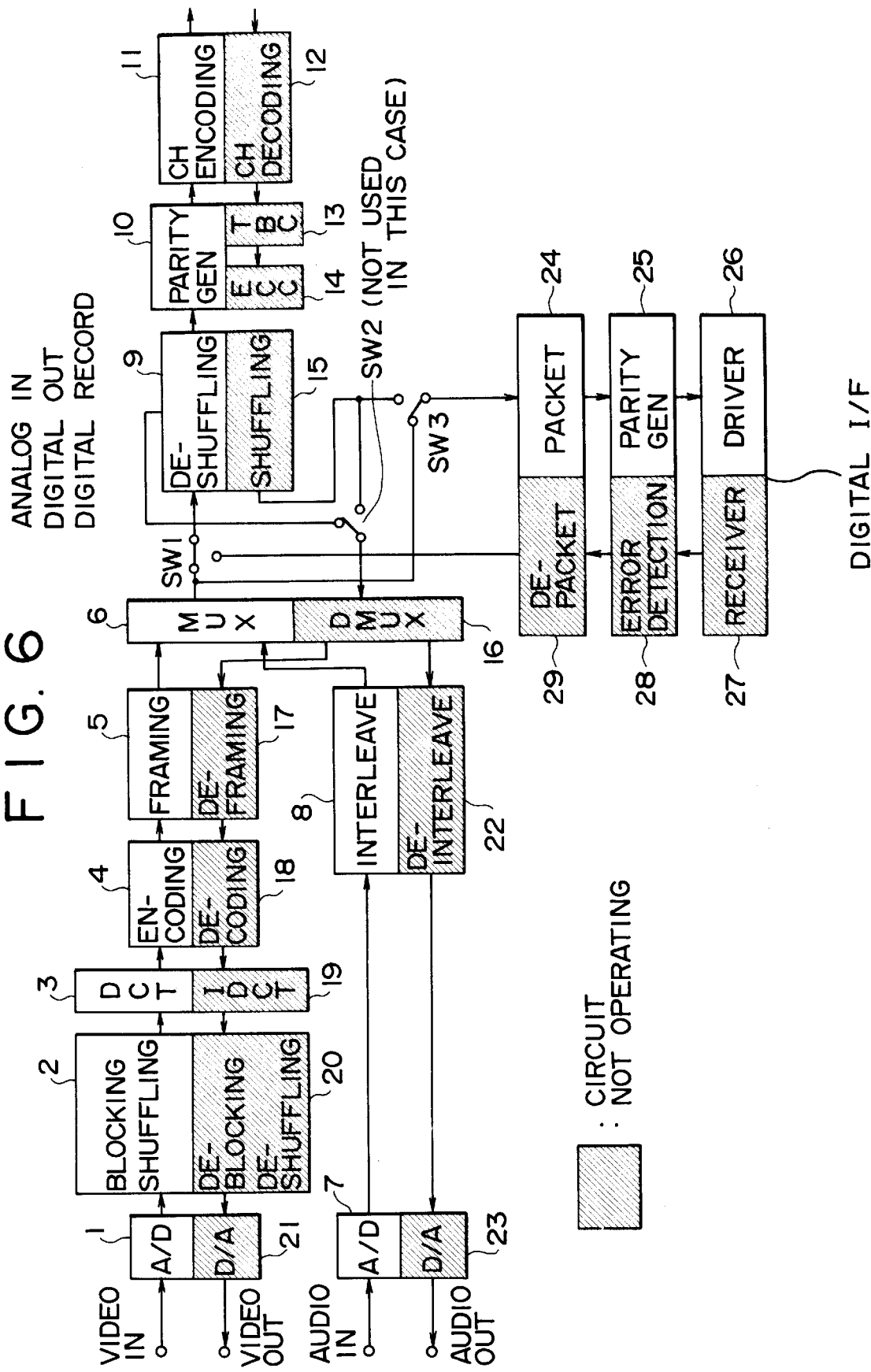

APPARATUS FOR RECORDING A DIGITAL VIDEO SIGNAL

BACKGROUND OF THE INVENTION

The present invention relates to a digital video tape recorder and, more particularly, to apparatus for recording a digital video signal which allows for the simultaneous monitoring of an input analog video signal or an input digital video signal which is digitally recorded on a record medium.

Analog video tape recorders are known to record analog video signals on a magnetic tape in analog form and to provide the video signal as an output signal so that the analog video signal may be monitored, e.g., viewed on a television monitor.

Digital video tape recorders are known to convert an analog video signal into a digital video signal and then to record the digital video signal on a magnetic tape. The recording and reproduction of digital video signals is more advantageous than the recording and reproduction of analog video signals because the picture quality of the reproduced digital video signal will not deteriorate through multiple dubbings. Moreover, error correction by way of digital processing further minimizes errors in recorded and reproduced digital video signals. However, the monitoring of digital video signals while they are being recorded cannot be accomplished merely by supplying the digital video signal to an output terminal. Digital video signals generally are transmitted on a digital serial interface line admitting of one data format while analog video signals admit of a second data format.

Further, a video signal to be recorded in digital form may be supplied as either a digital video signal or as an analog video signal whose formats, even after the analog signal is converted to digital form, are not the same. Current digital video tape recorders do not include the capability of recording video signals admitting of both of the above-mentioned data formats while providing an output signal that allows a user to monitor the video signals being recorded.

OBJECTS OF THE INVENTION

Therefore, it is an object of the present invention to provide apparatus for recording a digital video signal on a record medium which overcomes the shortcomings of prior art devices.

Another object of the present invention is to provide recording apparatus which also provides the digital video signal that is being recorded as an output signal so as to allow a user to monitor that digital video signal.

A further object of the present invention is to provide recording apparatus which is capable of recording a digital video signal supplied thereto as an analog video signal while simultaneously supplying on a digital interface line the signal being recorded.

An additional object of this invention is to provide recording apparatus which is capable of recording a digital video signal supplied thereto as a digital signal via a digital interface and simultaneously supplying an analog video signal as an output which corresponds to the digital video signal being recorded.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus is provided for receiving (e.g., on a digital serial interface transmission line) a digital video signal, producing a recordable digital video signal from the digital video signal, recording the recordable digital video signal on a record medium, converting the received digital video signal to an analog video signal and supplying the analog video signal as an output simultaneously with the recording of the recordable digital video signal.

In accordance with another embodiment of the present invention, apparatus is provided for receiving a digital video signal, detecting errors in the digital video signal, adding to the digital video signal error flags identifying respective detected errors, correcting the detected errors in the digital video signal in response to the added error flags to produce a corrected digital video signal, encoding the corrected digital video signal to provide a recordable digital video signal, recording the recordable digital video signal on a record medium, decompressing the digital video signal to provide a decompressed digital video signal, converting the decompressed digital video signal to an analog video signal and supplying the analog video signal as an output simultaneously with the recording of the recordable digital video signal.

In accordance with a further embodiment of the present invention, apparatus is provided for receiving an analog video signal, converting the analog video signal to a digital video signal, transmitting the digital video signal as an output, producing a recordable digital video signal from the digital video signal, and recording the recordable digital video signal on a record medium simultaneously with the transmitting of the digital video signal.

In accordance with still another embodiment of the present invention, apparatus is provided for receiving an analog video signal, converting the analog video signal to a digital video signal, shuffling blocks of the digital video signal to provide a shuffled digital video signal, orthogonally transforming the shuffled digital video signal to provide a transformed digital video signal, quantizing the transformed digital video signal to provide a quantized digital video signal, framing the quantizing digital video signal to provide a framed digital video signal, deshuffling the framed digital video signal to provide a deshuffled digital video signal, adding parity data to the deshuffled digital video signal, channel encoding the deshuffled digital video signal to provide a recordable digital video signal, recording the recordable digital video signal on a record medium, and transmitting the framed digital video signal as an output simultaneously with the recording of the recordable digital video signal.

In accordance with still a further embodiment of the present invention, apparatus is operable in a first of two recording modes for receiving a digital video signal, producing a recordable digital video signal from the digital video signal, converting the digital video signal to an analog video signal, supplying the analog video signal as an output, and recording the recordable digital video signal on a record medium simultaneously with the supplying of the analog video signal as an output. The apparatus is further operable in the second recording mode for receiving an analog video signal, converting the analog video signal to a digital video signal, producing a recordable digital video signal from the digital video signal, transmitting the digital video signal as an output, and recording the recordable digital video signal on a record medium simultaneously with the transmitting of the digital video signal.

BRIEF DESCRIPTION OF THE DRAWINGS

The following detailed description, given by way of example, and not intended to limit the present invention solely thereto, will best be appreciated in conjunction with the accompanying drawings, wherein like reference numerals denote like elements and parts, in which:

FIGS. 1A and 1B are block diagrams illustrating recording and reproducing operations, respectively, in accordance with the present invention;

FIG. 2 is a block diagram of apparatus for recording a digital video signal operating in a recording mode in which a supplied digital video signal is recorded on a record medium and supplied as an output in analog form;

FIG. 3 is a block diagram of the inventive apparatus operating in a non-recording mode;

FIG. 4 is a block diagram of apparatus for recording a digital video signal operating in a second recording mode in which a supplied digital video signal is recorded on a record medium and an error-corrected analog video signal is supplied as an output;

FIG. 5 is a block diagram of the inventive apparatus operating in a second non-recording mode;

FIG. 6 is a block diagram of apparatus for recording a digital video signal operating in a third recording mode in which a supplied analog video signal is recorded on a record medium in digital form and supplied as an output in digital form.

DETAILED DESCRIPTION OF CERTAIN PREFERRED EMBODIMENTS

Figure 7:
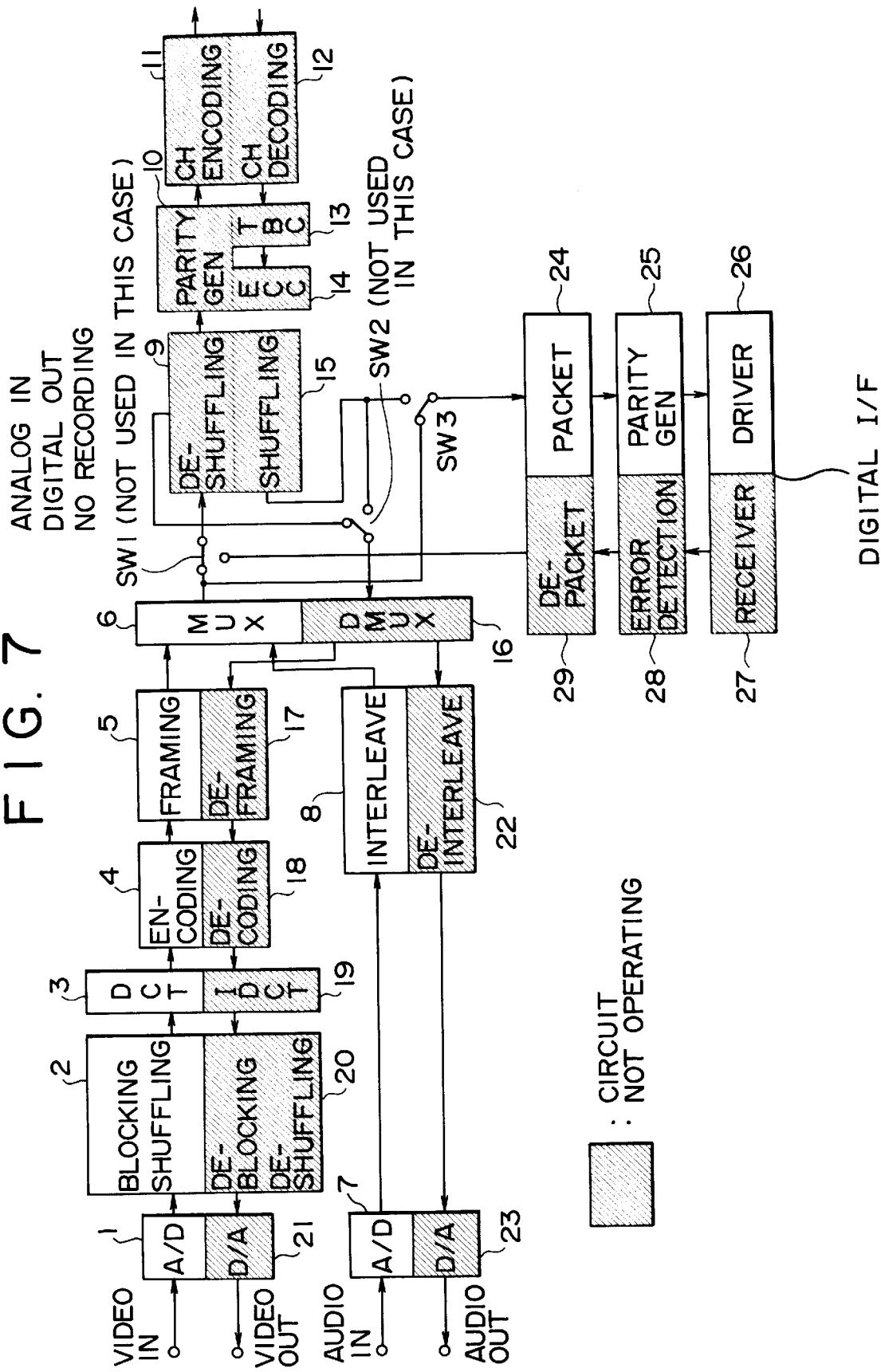
FIG. 7 is a block diagram of the inventive operating in a third non-recording mode.

Referring now to the drawings, FIGS. 1A and 1B are block diagrams of recording and reproducing circuits, respectively, of a digital video tape recorder in which the present invention finds ready application. As shown in FIG. 1A, the recording circuit is comprised of an analog to digital (A/D) converter 1, a blocking/shuffling circuit 2, a discrete cosine transformation (DCT) circuit 3, an encoding circuit 4, a framing circuit 5, a deshuffling circuit 9, a parity generator (PTG) 10 and a channel encoding circuit 11. In addition, an A/D converter 7 and an interleave circuit 8 are provided for processing a supplied audio signal, and a multiplexer 6 is provided for multiplexing the video and audio signals.

During a recording operation, analog video and audio signals are supplied to A/D converters 1 and 7, respectively, which convert the signals into a digital video signal and a digital audio signal, respectively. The digital video signal is supplied to blocking/shuffling circuit 2 which produces blocks (e.g., 8 pixels by 8 pixels) of video data from those portions of the digital video signal containing the useful video data, that is, those portions of the digital video signal which correspond to a blanking period are discarded. The blocks of video data are shuffled to provide units of blocks each of which includes four luminance blocks of video data and two chrominance blocks of video data. Blocking/shuffling circuit 2 supplies the shuffled video data to DCT circuit 3 which performs a discrete cosine transformation of each of the blocks of video data to produce DCT transformed blocks of video data.

DCT circuit 3 supplies the transformed blocks of video data to an encoding circuit 4 which quantizes and variable-length codes (VLC) the data using a two-dimensional Huffman coding technique as is known in the art. Quantization is carried out by adjusting a quantization step for each 30 transformed blocks of video data, known as a buffering unit, so as to produce a constant amount of data. Encoder 4 supplies the encoded video data to framing circuit 5 which "builds" a frame of video data by adding error correction code (ECC) to the video data and providing the video data with the error correction code in a format consistent with known digital recording formats. The digital video data is supplied to multiplexer 6.

An analog audio signal is supplied to A/D converter 7 which converts the analog audio signal to a digital audio signal that is coupled to interleave circuit 8 which performs interleaving of the digital audio signal. As is known, interleaving of audio signals reduces the affects of errors on the quality of the sound due to burst errors which occur during recording or reproducing operations. The audio signal is supplied to multiplexer 6 which multiplexes the audio signal with the video signal supplied from framing circuit 5 and supplies the multiplexed signal to deshuffling circuit 9. A frame memory (not separately shown) in deshuffling circuit 9 stores a frame of video (and audio) data contained in the digital signal and the data stored in the frame memory is deshuffled such that DCT blocks of video data which represent adjacent positions of an image displayed on, for example, a television monitor are located at adjacent positions when stored on a Magnetic tape. The deshuffled signal is supplied to parity generator 10 which adds parity data (e.g., parity bits) to the deshuffled signal. Parity generator 10 supplies the deshuffled signal (with the added parity data) to channel encoding circuit 11 which modulates the signal so as to convert the video signal into a recordable signal before serially recording the digital video signal on a magnetic tape (not shown).

A reproducing operation of the digital video tape recorder in which the present application finds ready application will next be described with reference to FIG. 1B. As shown, the reproducing circuit is comprised of a channel decoding circuit 12, a time base correction circuit (TBC) 13, an error correction (ECC) circuit 14, a shuffling circuit 15, a demultiplexer 16, a deframing circuit 17, a decoding circuit 18, an inverse-discrete cosine transformation (IDCT) circuit 19, a deblocking/deshuffling circuit 20 and a digital to analog (D/A) converter 21. In addition, a de-interleave circuit 22 and a digital to analog (D/A) converter 23 are used for processing the reproduced digital audio signal.

During a reproducing operation, a reproducing head or heads (not separately shown) serially reproduces a digital video signal recorded on a magnetic tape (not shown). The reproduced digital video signal is converted to parallel form and demodulated in channel decoding circuit 12 in a manner inverse to that performed by channel encoding circuit 11. The demodulated video signal is supplied to time base correction (TBC) circuit 13 which corrects the time base (or time axis) of the reproduced video signal. TBC circuit 13 supplies the video signal to error correction circuit (ECC) 14 which corrects errors in the reproduced video signal and adds error flags to those portions of the video signal that contain uncorrectable erroneous data. ECC circuit 14 supplies the error corrected video signal to shuffling circuit 15 which stores each frame contained in the video signal in a frame memory (not separately shown) and shuffles the stored video signal in a manner inverse to that performed by deshuffling circuit 9 so as to provide buffering units of video data. Further, shuffling circuit 15 replaces erroneous data identified by the added error flags with corresponding data of a previous frame of video data already stored in the frame memory.

Shuffling circuit 15 supplies the shuffled signal to demultiplexer 16 which demultiplexes the shuffled signal to provide a digital signal containing only video data to deframing circuit 17 and to provide a digital signal containing only audio data to de-interleave circuit 22.

Deframing circuit 17 "deframes" the digital video signal by extracting quantized variable length coded data and supplies the deframed digital video signal to decoding circuit 18 which decodes the signal in a manner inverse to that performed by encoding circuit 4. Specifically, decoding circuit 18 decodes the variable length coded data and inverse-quantizes the data to produce a decoded video signal. The decoded video signal is supplied to inverse-discrete cosine transformation (IDCT) circuit 19 which performs an inverse-discrete cosine transformation of the decoded video signal to produce blocks of video data which are supplied to deblocking/deshuffling circuit 20 which rearranges the data in the blocks to produce a digital "component" video signal. The digital component video signal is supplied to D/A converter 21 which converts the digital component video signal to an analog video signal and supplies the analog video signal as an output.

As previously stated, demultiplexer 16 supplies the audio component of the reproduced digital signal to de-interleave circuit 22. De-interleave circuit 22 "de-interleaves" the audio signal in a manner inverse to that performed by interleave circuit 8 and supplies the de-interleaved audio signal to D/A converter 23 which converts the de-interleaved digital audio signal to an analog audio signal and supplies the analog audio signal as an output signal.

Referring next to FIG. 2, apparatus for recording a digital video signal which is capable of recording a digital video (and audio) signal supplied as an analog video (and audio) signal and which supplies the digital video signal as an output signal on a digital serial interface line in accordance with the present invention is illustrated. As shown, the digital video tape recorder of the present invention includes the same circuit components as illustrated in the digital video tape recorder of FIGS. 1A and 1B and is further comprised of a packet circuit 24, a parity generator (PTG) 25, a driver 26, a receiver 27, an error detection circuit 28 and a de-packet circuit 29.

In a recording mode in which a digital video signal is supplied to the digital video tape recorder of the present invention, the digital video signal is supplied serially to receiver 27 via a digital interface cable or the like which converts the serial data in the digital video signal to parallel data and channel decodes the parallel data to produce a decoded digital video signal. Receiver 27 supplies the decoded digital video signal to error detection circuit 28 which detects errors that exist in packets of data contained in the decoded digital video signal and adds error flags to those packets of data in which errors are detected. The packets of data are supplied to de-packet circuit 29 which restores (i.e., produces) buffering units of video data from the packets of data and supplies the buffering units of video data to a switch SW1 and to a switch SW2.

During recording of the digital video signal, switch SW1 is set so as to supply the buffering units of video data supplied from de-packet circuit 29 to deshuffling circuit 9 which deshuffles the buffering units in a manner previously described. Further, deshuffling circuit 9 replaces erroneous data identified by the added error flags with corresponding data of a previous frame of video data already stored in the frame memory. The deshuffled digital video signal is supplied via parity generator 10 to channel encoding circuit 11 which channel encodes and records the digital video signal on a magnetic tape (not shown), as previously described.

Also during recording of the digital video signal, switch SW2 is set so as to supply the buffering units of video data supplied from de-packet circuit 29 to demultiplexer 16. The buffering units of video data are demultiplexed to provide a digital signal containing only video data and a digital signal containing only audio data which are supplied to deframing circuit 17 and de-interleave circuit 22, respectively. The digital video signal is deframed, decoded, inverse-discrete cosine transformed and deblocked/deshuffled by circuits 17, 18, 19 and 20, respectively, in the same manner as previously described with reference to FIG. 1B. Further, the digital audio signal is de-interleaved by de-interleave circuit 22. The digital, video and audio signals are converted to analog video and audio signals by D/A converters 21 and 23, respectively, which are supplied as analog output signals to a monitor (not shown) or other device which receives analog video and audio signals. The shaded circuits shown in FIG. 2 are not utilized during the above-described digital recording operation and it will be appreciated that, as represented herein, the shaded circuits are rendered inactive, or non-operative, by selectively supplying disable signals thereto from a suitable controller (not shown) when particular operating modes are selected, as will be described.

It is seen that the digital video tape recorder of the present invention as illustrated in FIG. 2 is operable to receive a digital video signal via a digital serial interface line, to record the received digital video signal in a suitable format on a record medium, and to supply simultaneously the received digital video signal as an analog video signal in a format consistent with known analog video signal formats so as to allow an operator to monitor the digital video signal being recorded or to utilize the analog video signal in another manner, e.g., performing a second recording of the digital video signal in an analog format.

FIG. 3 is a block diagram of the apparatus of the present invention operating in a non-recording mode in which a received digital video signal is supplied as an output analog video signal when the digital video signal is not being recorded on the record medium. In the non-recording mode, switch SW1 may be thought of as "open" and switch SW2 is set so as to supply the buffering units of video data supplied from de-packet circuit 29 to demultiplexer 16. That is, switch SW1 (not shown in FIG. 3) is set so that the buffering units are not supplied to deshuffling circuit 9; hence, the received digital video signal is not recorded on a magnetic tape. Shaded circuits 9, 10 and 11 are not utilized in the non-recording mode, as shown in FIG. 3.

FIG. 4 illustrates the operation of the present invention in a recording mode in which the supplied digital video signal is recorded on the record medium and is error corrected prior to being supplied as an output analog video signal. In this second recording mode, the received digital video signal is processed and recorded in the same manner as in the first recording mode, as previously described with reference to FIG. 2.

In the second recording mode, switch SW2 is set so as not to supply the buffering units from de-packet circuit 29 to demultiplexer 16, but to couple a second output of deshuffling circuit 9 to the demultiplexer. Consequently, buffering units supplied from de-packet circuit 29 in a previous frame and stored in the frame memory of deshuffling circuit 9 replace erroneous data identified by the error flags that had been added to the signal by error detection circuit 28, as previously described. Deshuffling circuit 9 supplies the error corrected (or replaced) buffering units, that have not been deshuffled, to demultiplexer 16 via switch SW2, and further supplies a deshuffled error corrected (or replaced) digital video signal to parity generator 10 in the manner described previously with reference to FIG. 2.

The non-deshuffled error corrected buffering units from deshuffling circuit 9 are demultiplexed by demultiplexer 16 and ultimately supplied as output analog video and audio signals in a manner similar to that performed in the recording mode described previously with reference to FIG. 2. The apparatus also includes a switch SW3 shown in FIG. 4 (and not shown in FIGS. 2 and 3) which, although not utilized in any of the operating modes thus far described, nevertheless is used when providing digital video and audio output signals for digital monitoring as described below.

It will be appreciated that in the second recording mode just described, error correction is carried out on video signals prior to supplying those video signals as output analog video signals, while in the first recording mode described previously, the digital video signals are not corrected before being supplied as output analog signals.

FIG. 5 illustrates another (i.e., a second) non-recording mode of the presentation in which a received digital video signal is error corrected prior to being supplied as an output analog video signal for monitoring, but the digital video signal is not recorded on the record medium. In this mode, the apparatus of the present invention operates in the same manner as that described with reference to FIG. 4 except parity generator 10 is inactive and, hence, the digital video signal is not recorded on magnetic tape.

FIG. 6 illustrates a third recording mode of operation of the present invention in which an input analog video signal supplied to the video input terminal is digitally recorded on the record medium and also is supplied as an output digital video signal to the digital serial interface line. In this third recording mode, analog video and audio signals are supplied to A/D converters 1 and 7, respectively, which convert the received analog signals to digital video and audio signals. The digital video signal is blocked/shuffled, discrete cosine transformed, encoded and framed in circuits 2, 3, 4 and 5, respectively, and the digital audio signal is interleaved in interleave circuit 8 in the manner described above with reference to FIG. 1A. The resulting digital video and audio signals are multiplexed in multiplexer 6 which supplies a multiplexed signal representing buffering units of data to switches SW1 and SW3.

In this mode, switch SW1 is set so as to supply the multiplexed signal from multiplexer 6 to deshuffling circuit 9 which deshuffles the signal in the manner described above. The deshuffled signal then is supplied via parity generator 10 to channel encoding circuit 11 which channel encodes and records the digital video signal on magnetic tape, also as previously described.

In the presently described recording mode, switch SW3 is set so that the multiplexed signal from multiplexer 6 also is supplied to packet circuit 24 which converts the multiplexed signal into packets of data, each of which contains an appropriate amount of data for transmission on the digital interface line. Packet circuit 24 supplies the data packets to parity generator 25 which adds parity data to the packets and supplies the resulting digital signal to driver 26. Driver 26 channel encodes the digital signal into a format compatible with the digital interface and serially transmits the encoded digital signal to the digital interface line. As will be recognized, the shaded circuits shown in FIG. 6 are not utilized in the third recording mode of operation.

It is seen that the present invention as described in conjunction with FIG. 6 is operable to receive an analog video signal, to digitally record that analog video signal on a record medium, and to supply simultaneously the received analog video signal as an output digital video signal in a format consistent with digital serial interface transmissions so as to allow an operator to monitor via a digital serial interface the analog video signal being digitally recorded. Of course, the digital interface permits the serially transmitted digital signal to be utilized in another manner, e.g., a second digital recording may be made of the supplied analog video signal.

FIG. 7 illustrates a further (e.g., a third) non-recording mode of operation of the present invention in which an output analog video signal is supplied as an output digital video signal on a digital serial interface line even though the digital video signal is not being recorded. In this third non-recording mode, the present invention operates in the same manner as described with respect to FIG. 6, except deshuffling circuit 9, priority generator 10 and channel encoding circuit 11 are inactive (that is, they are not operating) and, hence, the digital video signal is not recorded on magnetic tape.

Editing of recorded digital video signals will now be described with reference to the various operating modes shown in FIGS. 2–7. Prior to performing actual editing of digital video signals that had been recorded, the following steps generally are performed so as to verify which portion of the recorded video signal is to be edited:

(a) A playback operation is carried out from a "preroll point" on the magnetic tape (i.e., a position on the magnetic tape prior to the position at which editing is to occur) to an "in point" on the magnetic tape (i.e., the position at which editing is to begin) for external synchronization purposes.

(b) A playback operation is carried out from the "in point" to an "out point" (i.e., a position on the magnetic tape at which editing is to terminate) so as to allow an operator to monitor the recorded digital video signal to be edited.

(c) A playback operation is carried out from the "out point" to a position after the "out point" for external synchronization purposes.

When a digital video signal that represents new information (i.e., the video signal which is to replace the previously recorded video signal) is supplied over the digital interface line, a pre-editing operation is carried out and the present invention operates in either of the non-recording modes illustrated in FIGS. 3 and 5. Thus, during step (b) above, the invention operates to provide the input digital video signal as an output analog video signal to be monitored. When the supplied video signal is in analog form, the invention operates in the non-recording mode illustrated in FIG. 7; and during step (b) the invention provides an output digital video signal to be monitored over the digital interface line.

When performing editing (i.e. recording) of digital video signals, the following steps are performed:

(a) A playback operation is carried out from the "preroll point" to the "in point" on the magnetic tape for external synchronization purposes.

(b) A recording operation is carried out from the "in point" to the "out point".

(c) A playback operation is carried out after the "out point" for external synchronization purposes.

When the new video signal is supplied over the digital interface line during the editing operation, the apparatus operates in either of the first or second recording modes illustrated in FIGS. 2 and 4 during recording step (b). If the new video signal is supplied as an analog signal, the apparatus operates in the recording mode illustrated in FIG. 6.

As previously described, a digital video signal that is supplied to the apparatus of the present invention via a digital interface line for recording on magnetic tape may also be monitored at the analog video and audio outputs. Since an input analog video signal results in an output digital video signal at the digital interface, it is possible to couple two digital video tape recorders which embrace the present invention via their digital interface lines (the digital interface output of one is connected to the digital interface output of the other) and to provide a video monitor with the analog output signals of either device so as to monitor the video signals that are reproduced by one device and recorded by the other. Further, the analog video output signal may be an error corrected signal, as represented by FIGS. 4 and 5. Similarly, two such devices may be coupled at their respective analog inputs and outputs, whereby monitors may be coupled to the digital interface lines of each of the devices.

While the present invention has been particularly shown and described in conjunction with preferred embodiments thereof, it will be readily appreciated by those of ordinary skill in the art that various changes and modifications may be made without departing from the spirit and scope of the invention. For example, although specific video and audio circuits have been shown and described, the present invention is not limited to the specific functions performed by these circuits and may utilize other video and audio circuits which are known in the art.

Therefore, it is intended that the appended claims be interpreted as including the embodiments described herein, the alternatives mentioned above, and all equivalents thereto.

What is claimed is:

1. An apparatus for recording a digital video signal on a record medium, comprising:
   receiving means for receiving an external digital video signal via a serial digital interface line, said receiving means including means for detecting errors in the received digital video signal and for adding to said digital video signal error flags identifying respective detected errors;
   producing means including means for correcting the detected errors in said digital video signal in response to the added error flags to produce a corrected digital video signal, and for producing a recordable digital video signal from said corrected digital video signal;
   recording means for recording said recordable digital video signal on a record medium; and
   converting means for converting the error corrected digital video signal to an error corrected analog video signal and supplying said error corrected analog video signal as an output, said converting means being operable to supply said error corrected analog video signal as an output simultaneously with the recording of said recordable digital video signal by said recording means.

2. The apparatus of claim 1, wherein said correcting means includes storage means for storing frames of said digital video signal; and wherein said correcting means is operable to correct errors detected in a frame of said digital video signal by replacing the detected errors with data in a corresponding portion of a previous frame of said digital video signal.

3. The apparatus of claim 2, wherein said receiving means is operable to receive a shuffled digital video signal; and said correcting means includes deshuffling means for deshuffling said shuffled digital video signal to produce a deshuffled digital video signal and supplying said deshuffled digital video signal as an output to said recording means.

4. The apparatus of claim 3, wherein said converting means is operable to convert said corrected digital video signal to a corrected analog video signal.

5. The apparatus of claim 4, wherein said correcting means is operable to correct said shuffled digital video signal to provide an error corrected shuffled digital video signal and to supply said error corrected shuffled digital video signal as an output to said converting means.

6. The apparatus of claim 1, wherein said receiving means is operable to receive a compressed digital video signal; said apparatus further comprising decompression means for decompressing the compressed digital video signal to provide a decompressed digital video signal; and wherein said converting means is operable to convert the decompressed digital video signal to a decompressed analog video signal and to supply the decompressed analog video signal as an output.

7. The apparatus of claim 6, wherein said receiving means is operable to receive an orthogonally transformed quantized digital video signal; and wherein said decompression means includes means for inverse quantizing said orthogonally transformed quantized digital video signal to produce an inverse quantized transformed digital video signal, and means for performing an inverse orthogonal transformation of said inverse quantized transformed digital video signal to produce an inverse transformed digital video signal; and wherein said converting means is operable to convert said inverse transformed digital video signal to an inverse transformed analog video signal.

8. The apparatus of claim 1, wherein said receiving means is operable to receive a serially transmitted digital video signal over a digital signal interface transmission line.

9. The apparatus of claim 1, wherein said apparatus is operable in a recording mode to record by said record means said recordable digital video signal on said record medium and to supply by said converting means said analog video signal as an output; and is operable in a non-recording mode to receive said digital video signal and to supply by said converting means as an output said analog video signal corresponding to the received digital video signal.

10. The apparatus of claim 9, wherein said receiving means includes means for detecting errors in said digital video signal and for adding to said digital video signal error flags identifying respective detected errors; said producing means includes means for correcting said detected errors in said digital video signal in response to the added error flags to produce a corrected digital video signal; and said converting means is operable to convert said corrected digital video signal to a corrected analog video signal for output in said recording mode and in said non-recording mode.

11. An apparatus for recording a digital video signal on a record medium, comprising:
   receiving means for receiving an external compressed digital video signal comprising packets of digital video data supplied via a serial digital interface line;
   error detection means for detecting errors in said digital video signal and for adding to said digital video signal error flags identifying respective detected errors therein;
   error correction means for correcting the detected errors in said digital video signal in response to the added error flags to produce a corrected digital video signal;
   encoding means for encoding said corrected digital video signal to provide a recordable digital video signal;
   recording means for recording said recordable digital video signal on a record medium;
   decompressing means for decompressing the corrected digital video signal to provide a decompressed corrected digital video signal; and converting means for converting said decompressed corrected digital video signal to an error corrected analog video signal and supplying said error corrected analog video signal as an output, said converting means being operable to supply said error corrected analog video signal as an output simultaneously with the recording of said recordable digital video signal by said recording means.

12. Method of recording a digital video signal on a record medium, comprising the steps of:

receiving an external digital video signal via a serial digital interface line;

detecting errors in the received digital video signal;

adding to said digital video signal error flags; identifying respective detected errors;

correcting the detected errors in said digital video signal in response to the added error flags to produce a corrected digital video signal;

producing a recordable digital video signal from the corrected digital video signal;

recording said recordable digital video signal on a record medium;

converting the error corrected digital video signal to an error corrected analog video signal; and supplying said error corrected analog video signal as an output simultaneously with the recording of said recordable digital video signal.

13. Method of recording a digital video signal on a record medium, comprising the steps of:

receiving an external compressed digital video signal comprising packets of digital video data, supplied via a serial digital interface line;

detecting errors in said digital video signal;

adding to data packets of said digital video signal error flags identifying respective detected errors therein;

correcting the detected errors in said digital video signal in response to the added error flags to produce a corrected digital video signal;

encoding said corrected digital video signal to provide a recordable digital video signal;

recording said recordable digital video signal on a record medium;

decompressing the corrected digital video signal to provide a decompressed corrected digital video signal;

converting said decompressed corrected digital video signal to an error corrected analog video signal; and supplying said error corrected analog video signal as an output simultaneously with the recording of said recordable digital video signal.

14. An apparatus for recording a digital video signal on a record medium, comprising:

a receiving circuit which includes a detecting circuit;

a producing circuit coupled to the receiving circuit;

a recording device coupled to the producing circuit; and a converting circuit;

wherein said receiving circuit receives an external digital video signal via a serial digital interface line and said detecting circuit detects errors in the received digital video signal and adds to said digital video signal error flags identifying respective detected errors;

wherein said producing circuit includes a correcting circuit which corrects the detected errors in said digital video signal in response to the added error flags to produce a corrected digital video signal and produces a recordable digital video signal from said corrected digital video signal;

wherein the recording device records said recordable digital video signal on a record medium; and wherein the converting circuit converts the error corrected digital video signal to an error corrected analog video signal and supplies said error corrected analog video signal as an output, said converting circuit being operable to supply said error corrected analog video signal as an output simultaneously with the recording of said recordable digital video signal by said recording device.

15. The apparatus of claim 14, wherein said correcting circuit includes a storage device wherein frames of said digital video signal are stored; and wherein said correcting circuit is operable to correct errors detected in a frame of said digital video signal by replacing the detected errors with data in a corresponding portion of a previous frame of said digital video signal.

16. The apparatus of claim 15, wherein said receiving circuit is operable to receive a shuffled digital video signal; and said correcting circuit includes a deshuffling circuit which deshuffles said shuffled digital video signal to produce a deshuffled digital video signal and supplies said deshuffled digital video signal as an output to said recording device.

17. The apparatus of claim 16, wherein said converting circuit is operable to convert said corrected digital video signal to a corrected analog video signal.

18. The apparatus of claim 17, wherein said correcting circuit is operable to correct said shuffled digital video signal to provide an error corrected shuffled digital video signal and to supply said error corrected shuffled digital video signal as an output to said converting circuit.

19. The apparatus of claim 14, wherein said receiving circuit is operable to receive a compressed digital video signal; said apparatus further comprising a decompression circuit which decompresses the compressed digital video signal to provide a decompressed digital video signal; and wherein said converting circuit is operable to convert the decompressed digital video signal to a decompressed analog video signal and to supply the decompressed analog video signal as an output.

20. The apparatus of claim 18, wherein said receiving circuit is operable to receive an orthogonally transformed quantized digital video signal; and wherein said decompression circuit includes an inverse quantizing circuit which inverse quantizes said orthogonally transformed quantized digital video signal to produce an inverse quantized transformed digital video signal, and an inverse orthogonal transformation circuit which performs an inverse orthogonal transformation of said inverse quantized transformed digital video signal to produce an inverse transformed digital video signal; and wherein said converting circuit is operable to convert said inverse transformed digital video signal to an inverse transformed analog video signal.

21. The apparatus of claim 14, wherein said receiving circuit is operable to receive a serially transmitted digital video signal over a digital signal interface transmission line.

22. The apparatus of claim 14, wherein said apparatus is operable in a recording mode to record by said recording device said recordable digital video signal on said record medium and to supply by said converting circuit said analog video signal as an output; and is operable in a non-recording mode to receive said digital video signal and to supply by said converting circuit as an output said analog video signal corresponding to the received digital video signal.

23. The apparatus of claim 22, wherein said converting means is operable to convert said corrected digital video signal to the corrected analog video signal for output in said recording mode and in said non-recording mode.

24. An apparatus for recording a digital video signal on a record medium, comprising:

a receiving circuit;

an error detection circuit coupled to the receiving circuit;

an error correction circuit coupled to the error detection circuit;

an encoding circuit coupled to the error correction circuit;

a recording device;

a decompressing circuit coupled to the error correction circuit; and a converting circuit coupled to the decompressing circuit;

wherein the receiving circuit receives an external compressed digital video signal comprising packets of digital video data supplied via a serial digital interface line;

wherein the error detection circuit detects errors in said digital video signal and adds to said digital video signal error flags identifying respective detected errors therein;

wherein the error correction circuit corrects the detected errors in said digital video signal in response to the added error flags to produce a corrected digital video signal;

wherein the encoding circuit encodes said corrected digital video signal to provide a recordable digital video signal;

wherein the recording device records said recordable digital video signal on a record medium;

wherein the decompressing circuit decompresses the corrected digital video signal to provide a decompressed corrected digital video signal; and wherein the converting circuit converts said decompressed corrected digital video signal to an error corrected analog video signal and supplies said error corrected analog video signal as an output, said converting circuit being operable to supply said error corrected analog video signal as an output simultaneously with the recording of said recordable digital video signal by said recording device.

* * * * *